(12) United States Patent
Nagakubo et al.

(10) Patent No.: US 7,123,318 B2
(45) Date of Patent: Oct. 17, 2006

(54) DOUBLE-SIDED EMISSIVE LIQUID CRYSTAL DISPLAY MODULE CONTAINING DOUBLE-SIDED ILLUMINATION PLATE AND MULTIPLE DISPLAY PANELS

(75) Inventors: Hideaki Nagakubo, Fukushima-ken (JP); Ko Owada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 250 days.

(21) Appl. No.: 10/689,247

(22) Filed: Oct. 20, 2003

(65) Prior Publication Data

US 2004/0100423 A1    May 27, 2004

(30) Foreign Application Priority Data

Oct. 24, 2002   (JP) .............................. 2002-309649

(51) Int. Cl.
  *G02F 1/1347*    (2006.01)
  *G02F 1/1335*    (2006.01)
(52) U.S. Cl. ............................. 349/74; 349/61; 349/62; 349/114
(58) Field of Classification Search ............ 349/60–65, 349/73, 74, 114
See application file for complete search history.

(56) References Cited

U.S. PATENT DOCUMENTS

| 4,637,687 | A | * | 1/1987 | Haim et al. .................... 349/81 |
| 4,693,560 | A | * | 9/1987 | Wiley .......................... 349/114 |
| 5,103,328 | A | * | 4/1992 | Numao .......................... 349/74 |
| 5,592,314 | A | * | 1/1997 | Ogasawara et al. ............ 349/18 |
| 6,707,515 | B1 | * | 3/2004 | Ide et al. ....................... 349/74 |
| 6,831,711 | B1 | * | 12/2004 | Choi et al. ..................... 349/74 |
| 6,847,427 | B1 | * | 1/2005 | Yamauchi ..................... 349/113 |

FOREIGN PATENT DOCUMENTS

JP    2000-338483    12/2000

* cited by examiner

*Primary Examiner*—Tarifur R. Chowdhury
(74) *Attorney, Agent, or Firm*—Brinks Hofer Gilson & Lione (57) ABSTRACT

A double-sided emissive LCD module includes a double-sided illumination plate, a first LCD panel disposed at the upper surface of the double-sided illumination plate, a second LCD panel disposed at the lower surface of the plate. The double-sided illumination plate includes a light source, a light guide plate, and a transflector. The transflector reflects a part of the light emitted from the lower surface of the light guide plate to the first LCD panel, while transmits the rest of the light to the second LCD panel.

4 Claims, 5 Drawing Sheets

PRIOR ART

US 7,123,318 B2

DOUBLE-SIDED EMISSIVE LIQUID CRYSTAL DISPLAY MODULE CONTAINING DOUBLE-SIDED ILLUMINATION PLATE AND MULTIPLE DISPLAY PANELS

This application claims the benefit of priority to Japanese Patent Application No. 2003-309649 filed on Oct. 24, 2002, herein incorporated by reference.

BACKGROUND OF THE INVENTION

1. Field of the Invention

The present invention relates to double-sided emissive liquid crystal display (LCD) modules, and more particularly, a double-sided emissive LCD module enabling effective use of light from a backlight.

2. Description of the Related Art

In recent years, portable information terminals, such as cellular phones, personal digital assistants, and portable terminals with a cellular phone function and the capability of displaying a large number of messages, have become widely available. Portable information terminals often use transflective LCDs to save power. Under bright lighting conditions the transflective LCDs operate in a reflective mode, while under poor lighting conditions they operate using backlights, frontlights, and so on.

Among portable, information terminals, cellular phones usually have a primary display for displaying various information such as transmitted and received messages on the front face of a housing. Recently, a cellular phone that has an auxiliary display on the back face of the housing has become commercially available.

Figure 6A:
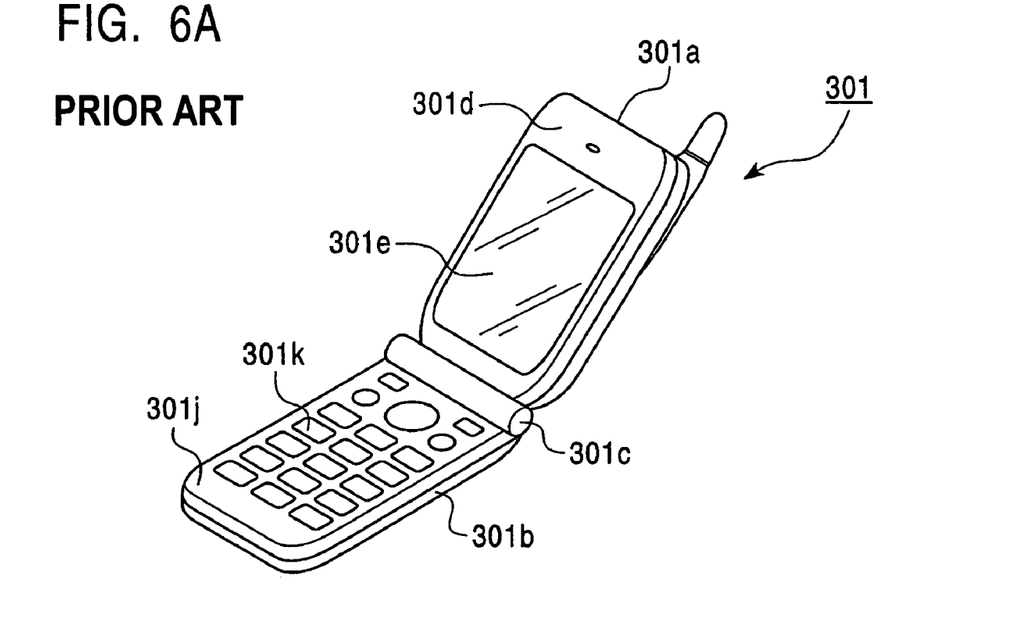
FIGS. 6A and 6B are perspective views of a cellular phone as seen from the primary display side and the auxiliary display side respectively.
Figure 6B:
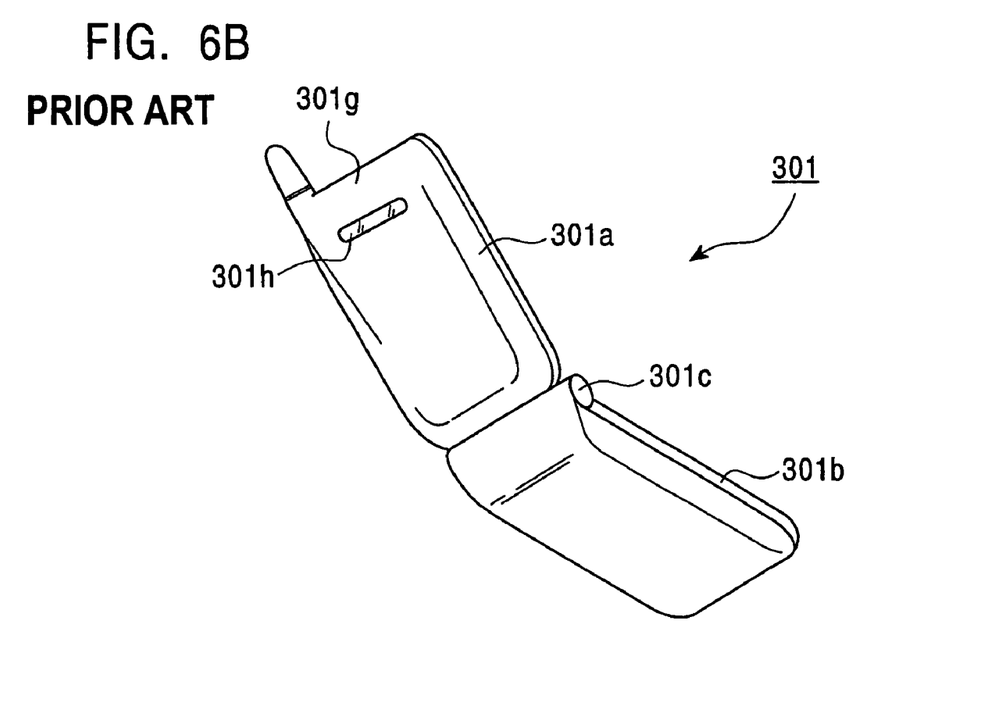

FIGS. 6A and 6B show external views of such a cellular phone. A cellular phone 301 consists of an upper housing 301a and a lower housing 301b that are connected with a hinge 301c enabling the phone to open and close freely. A double-sided emissive LCD module is built into the upper housing 301a and is composed of a primary display unit and an auxiliary display unit. The primary display unit has a primary display 301e exposed on an operation side 301d of the phone. The auxiliary display unit has an auxiliary display 301h exposed on a back housing 301g.

An operating side 301j on the lower housing 301b has a keyboard 301k for dialing and other operations.

Figure 7:
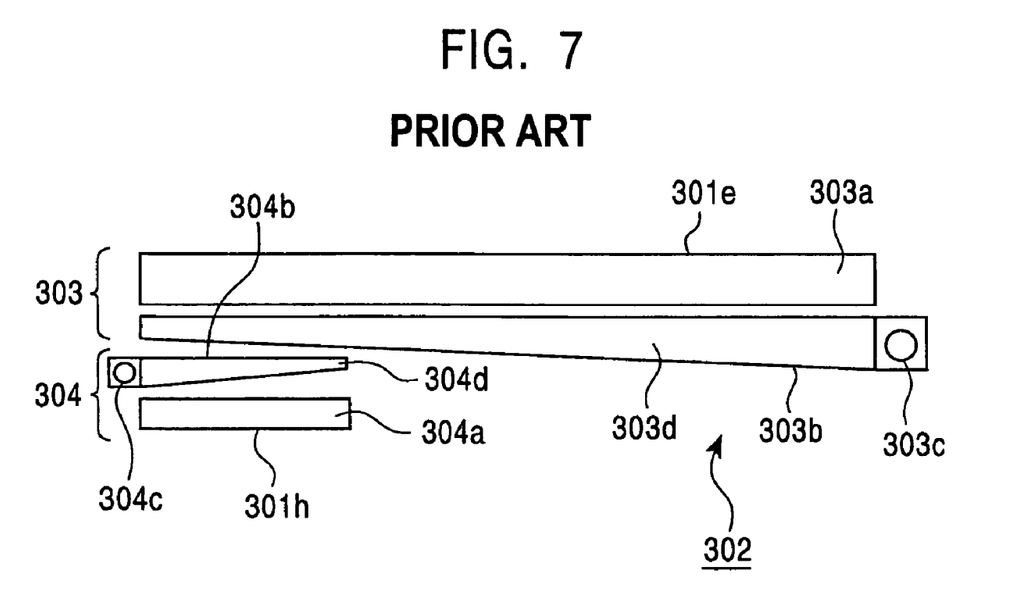
FIG. 7 shows a side elevation of a known double-sided emissive LCD module built into the cellular phone in FIG. 6.

FIG. 7 shows the detailed structure of the double-sided emissive LCD module. The double-sided emissive LCD module 302 is composed of a primary display unit 303 including the primary display 301e and an auxiliary display unit 304 having the auxiliary display 301h. The primary display unit 303 is composed of a transflective LCD panel 303a (hereinafter called a primary display panel) and a primary backlight 303b for illuminating the primary display panel 303a. The primary backlight 303b is composed of a light source 303c and a light guide plate 303d.

The auxiliary display unit 304 is composed of a transflective LCD panel 304a (hereinafter called an auxiliary display panel) smaller than the primary display panel 303a and an auxiliary backlight 304b for illuminating the auxiliary display panel 304a. The auxiliary backlight 304b is composed of a light source 304c and a light guide plate 304d.

The primary backlight 303b is larger than the auxiliary backlight 304b, but both of them consist of almost the same components (light sources 303c and 304c, and light guide plates 303d and 304d).

Even when the upper housing 301a and the lower housing 301b are folded together via the hinge 301c, the auxiliary display 301h is on the back of the upper housing 301a. Thus, various information of the cellular phone 301 can be seen without opening the upper housing 301a and the lower housing 301b.

However, the known cellular phone 301 has both the primary backlight 303b and the auxiliary backlight 304b. This has the drawback of requiring a large number of parts and a complicated internal structure, thus resulting in a thicker product.

In view of the fact that the primary backlight 303b and the auxiliary backlight 304b are composed of the same kind of components, a single backlight which combines the backlights for the primary display unit and the auxiliary display unit is disclosed in Japanese Unexamined Patent Application Publication No. 2000-338483.

SUMMARY OF THE INVENTION

It is therefore an object of the present invention to provide a double-sided emissive LCD module which requires fewer components, has a simple internal structure, and enables effective use of light from a backlight.

To achieve the above object, the present invention employs the following structure.

The double-sided emissive LCD module of the present invention has a double-sided illumination plate, a first LCD panel disposed at the upper surface of the double-sided illumination plate, and a second LCD panel disposed at the lower surface of the double-sided illumination plate. The double-sided illumination plate has a light source, a light guide plate which guides light from the light source and emits the light to the upper and lower surfaces, and a transflector attached to the lower surface of the light guide plate facing the second LCD panel. The transflector reflects a part of the light emitted from the light guide plate to the first LCD panel, while it transmits the rest of the white light to the second LCD panel.

The double-sided illumination plate of the double-sided emissive LCD module includes a transflector for transmitting the white light to the second LCD panel. This allows the second LCD panel to achieve high contrast.

Also, a single double-sided illumination plate illuminates both the first and second LCD panels. Thus, the double-sided emissive LCD module needs fewer components, resulting in a simple structure.

Furthermore, no openings are formed on the transflector. Therefore, when viewed from the first LCD panel, the entire surface of the panel display is uniformly illuminated, thereby realizing favorable display.

Preferably, the double-sided illumination plate of the present invention emits 70 to 90 percent of the whole amount of light emitted to the upper and the lower surfaces of the plate to the upper surface, and 10 to 30 percent of the whole amount of light to the lower surface.

In this double-sided emissive LCD module, the double-sided illumination plate emits 70 to 90 percent of the whole amount of light to the upper surface, thus enhancing the luminance of the first LCD panel. In particular, when the first LCD panel is large and used as a primary LCD panel, luminance all over the display surface is enhanced.

Also, 10 to 30 percent of the whole amount of light is emitted to the lower surface: thus a higher luminance of the second LCD panel is achievable, compared with the case where there is no lighting means such as an illuminant. In particular, when the second LCD panel 20 is small and used as an auxiliary LCD panel, a smaller absolute amount of light is required; 10 to 30 percent of the amount of light gives enough luminance.

Preferably, the first LCD panel and the second LCD panel are transflective LCD panels. In this double-sided emissive LCD module, the first and the second LCD panels are transflective. Thus, light emitted from the double-sided illumination plate and external light entering from outside of the module are both used for display. This realizes high luminance and high contrast on the panels.

Preferably, the module has a prism sheet which is disposed between the double-sided illumination plate and the first LCD panel. In this double-sided emissive LCD module, the prism sheet enhances the luminance of the first LCD panel.

In the module of the present invention, the double-sided illumination plate has a transflector which transmits the white light emitted from the light guide plate to the second LCD panel. This enhances contrast on the second LCD panel.

Also a single double-sided illumination plate illuminates both the first and the second LCD panels. This allows the double-sided emissive LCD module to reduce the number of components, resulting in a simplified module structure.

Furthermore, the transflector has no openings. When viewed from the first LCD panel, the entire surface of the panel display is uniformly illuminated, thereby realizing favorable display.

DESCRIPTION OF THE PREFERRED EMBODIMENTS

Referring to the drawings, an embodiment of the present invention is described.

Figure 1:
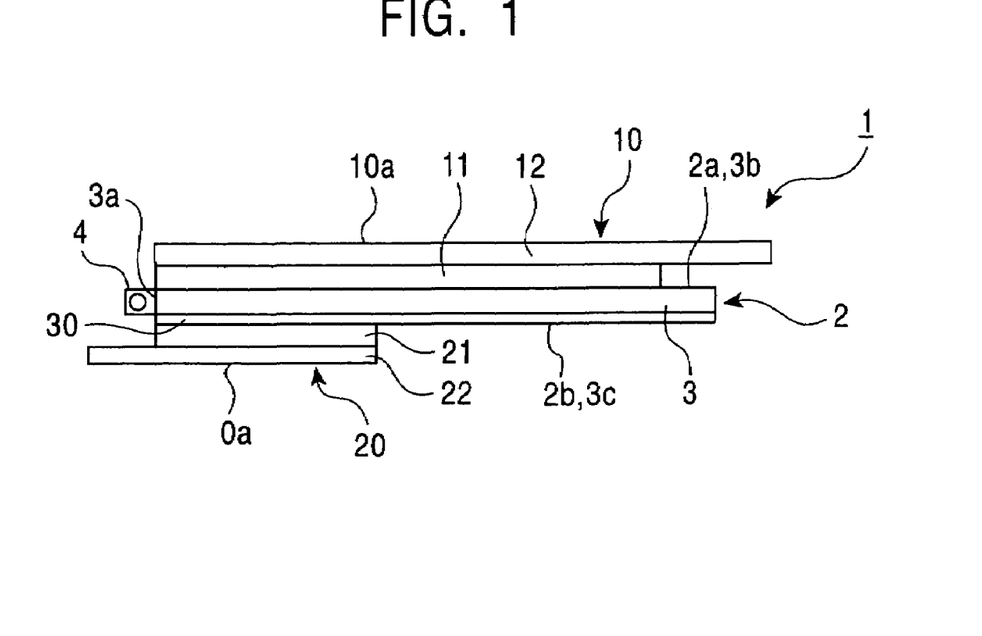
FIG. 1 shows a side elevation of the structure of a double-sided emissive LCD module which is an embodiment of the present invention.
Figure 2:
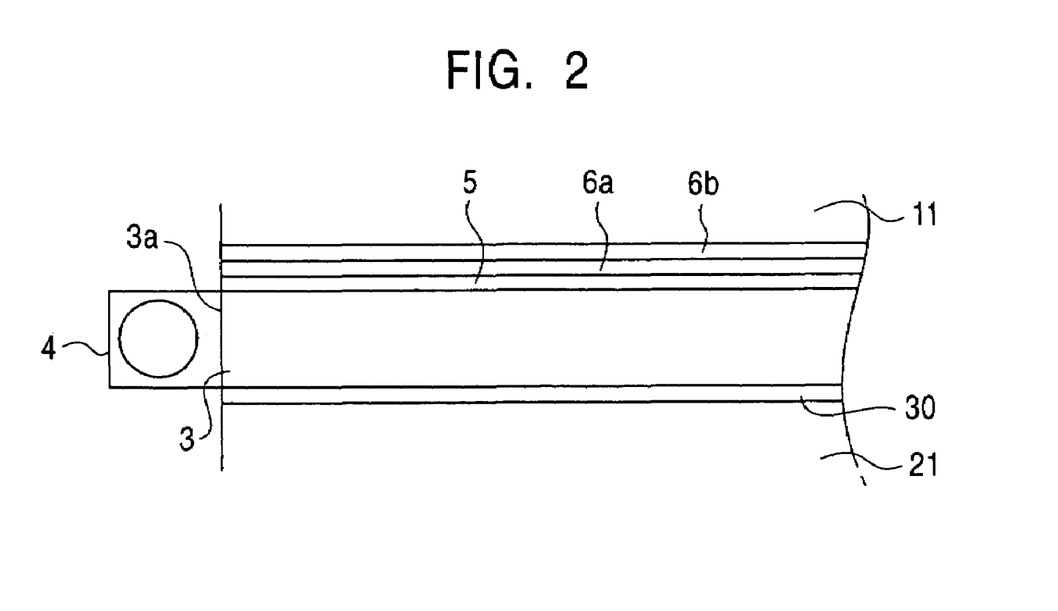
FIG. 2 shows a side elevation of the main part of FIG. 1.
Figure 3:
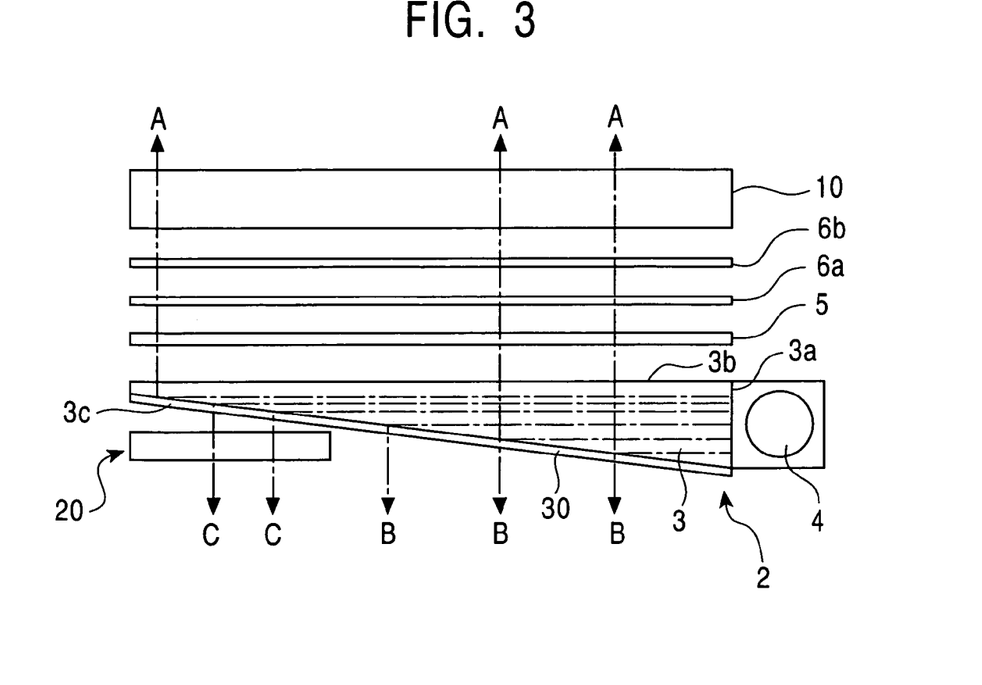
FIG. 3 is a schematic view of the double-sided emissive LCD module of the embodiment of the present invention.

FIG. 1 shows a side elevation of an embodiment of the double-sided emissive LCD module of the present invention. FIG. 2 shows a side elevation of the main part of FIG. 1. FIG. 3 shows a schematic view that describes the operation of the double-sided emissive LCD module.

As shown in FIGS. 1 to 3, this embodiment of the double-sided emissive LCD module 1 includes a double-sided illumination plate 2, a first LCD panel 10 that is disposed at the upper surface 2a of the double-sided illumination plate 2, and a second LCD panel 20 that is disposed at the lower surface 2b of the double-sided illumination plate 2.

The double-sided illumination plate 2 includes substantially rectangular light guide plate 3, a light source 4 installed along an end 3a of the light guide plate 3, and a transflector 30 disposed on a surface 3c, facing the second LCD panel 20, of the light guide plate 3.

The light source 4 irradiates the end 3a of light guide plate 3 with light. Examples of the light source 4 are a white light emitting diode (LED) installed at an end or both ends of a rod light guide made of transparent resin, a plurality of white LEDs arranged along the end 3a of the light guide plate 3, a bold cathode fluorescent tube (CCFT), and others.

The light guide plate 3 receives light from the light source 4 via the end 3a, and then transmits the light toward both the upper and lower surfaces (3b and 3c, or 2a and 2b) of the plate 3. The material for the light guide plate 3 is a clear resin such as acrylic resin, polycarbonate resin, epoxy resin, or glass. Acrylic resin is particularly suitable.

The light guide plate 3 emits approximately equal amounts of light from both surfaces 3b and 3c.

The transflector 30 is a sheet having both light reflecting and transmitting characteristics. It reflects a part of the white light emitted from the lower surface 3c of the double-sided illumination plate 2 to the first LCD panel 10, while it transmits the rest of the white light to the second LCD panel 20. The transflector 30 is disposed between the light guide plate 3 and the second LCD panel 20; more precisely, it is bonded to the lower surface 3c of the light guide plate 3.

The thickness of the transflector 30 is between 50 μm and 125 μm, preferably 80 μm. The amount of light supplied to the first LCD panel 10 and the second LCD panel 20 is controlled by the reflectance of the transflector 30.

Figure 4A:
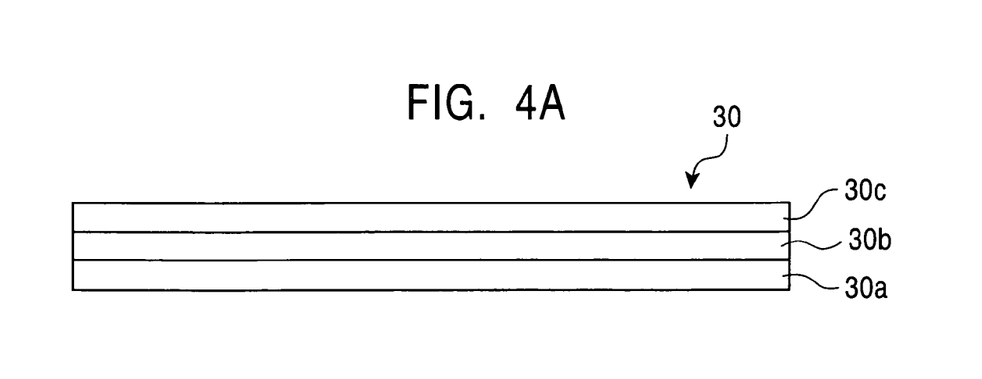
FIG. 4 is a schematic view of the structure of a transflector.
Figure 4B:
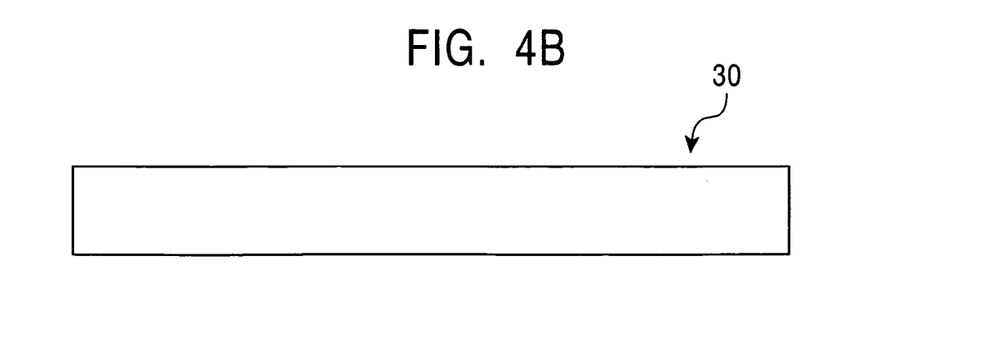

An example of the transflector 30, shown in FIG. 4A, includes a white layer 30a made of polyethylene terephthalate or the like, an adhesive layer 30b, and a reflective layer 30c made of polyolefins or the like. Another example, shown in FIG. 4B, is a white member made of highly reflective polyethylene terephthalate or the like.

The double-sided illumination plate 2 emits 70 to 90 percent of the total amount of the light to the upper surface 2a, and 10 to 30 percent to the lower surface 2b.

When the double-sided illumination plate 2 emits below 70 percent of the light toward the first LCD panel 10, the display of the panel 10 is dark. Also, when the double-sided illumination plate 2 emits above 90 percent of the light toward the first LCD panel 10, the amount of light to the second LCD panel 20 is so small that the display of the panel 20 is dark. Therefore, both cases are not preferable.

These percentages of the light are adjustable by changing the designs of the transflector 30 and/or the light guide plate 3, specifically, by changing the reflectance of the transflector 30 and/or by roughening the upper surface 3b or the lower surface 3c of the light guide plate 3. To roughen the surfaces, embossing or grain finishing is used.

By roughening the upper and lower surfaces 3b and 3c of the light guide plate 3, their roughness diffuses the light emitted from inside of the light guide plate 3, thus reducing the brightness. This effect is used for adjustment in such a way that roughening the upper surface 3b reduces the amount of light transmitted to the second LCD panel 20.

Preferably the light emitted to the second LCD panel 20 is white light. Since the light is used for illuminating the second LCD panel 20, colorless white light enhances the contrast on the display of the second LCD panel 20.

As shown in FIG. 1, the first LCD panel 10 is a substantially rectangular transflective LCD panel and is disposed to face most of the upper surface 2a of the double-sided illumination plate 2. A liquid crystal layer (not shown) lies between a first substrate 11 and a second substrate 12 that are made of glass or the like. The first LCD panel 10 is formed by bonding these substrates 11 and 12 and the liquid crystal layer with a sealant. The side of the second substrate 12 not facing the liquid crystal layer is a display surface 10a. A transflector and a display circuit (neither are shown in the drawings) are laminated on the surface of the first substrate 11 facing the liquid crystal layer. A display circuit (not shown) is formed on the surface of the second substrate 12 facing the liquid crystal layer.

The transflector in the first LCD panel 10 transmits the light entering from the double-sided illumination plate 2 to the display surface 10a, and reflects external light entering from the display surface 10a. The transflector is formed, for example, by laminating a thin reflective film or by laminating a reflective film having many holes on the transparent substrate. The display circuit includes an electrode layer for driving the liquid crystal layer and an alignment layer. In some cases the display circuit also includes a color filter.

The second LCD panel 20 is a transflective LCD panel which is substantially rectangular and smaller than the first LCD panel 10. The second LCD panel 20 is disposed to face a part of the lower surface 2b of the double-sided illumination plate 2.

The second LCD panel 20 is formed by bonding a liquid crystal layer (not shown), a first substrate 21, and a second substrate 22 with a sealant. The liquid crystal layer lies between the first and the second substrates 21 and 22, which are made of glass or other materials. The side of the second substrate 22 facing the liquid crystal layer is a display surface 20a. A transflector and a display circuit (neither are shown in the drawings) are laminated on the surface of the first substrate 21 facing the liquid crystal layer. The other display circuit (not shown) is formed on the surface of second substrate 22 facing the liquid crystal layer. The transflector and the display circuits have the same composition as those of the first LCD panel 10. Here, the transflector transmits the light entering from the double-sided illumination plate 2 to the display surface 20a and reflects the external light from the display surface 20a.

As shown in FIG. 2, a diffusion sheet 5 and prism sheets 6a and 6b lie between the upper surface 2a of the double-sided illumination plate 2 and the first substrate 11 of the first LCD panel 10. These sheets 5, 6a, and 6b are laminated over the upper surface 2a of the double-sided illumination plate 2. The diffusion sheet 5 diffuses the light emitted from the upper surface 2a to improve the luminance uniformity. The prism sheets 6a and 6b have a number of small prisms in parallel rows on their surface. The prism direction of the prism sheets 6a and that of the prism sheet 6b are orthogonal. The prism sheets 6a and 6b converge light within a specified viewing angle range to increase the luminance within this range.

A diffusion sheet and a prism sheet may be disposed between the lower surface 2b of the double-sided illumination plate 2 and the first substrate 21 of the second LCD panel 20.

Next, referring to FIG. 3, the operation of the double-sided emissive LCD module in this embodiment of the present invention is described. Light emerging from the light source 4 is introduced via the end 3a to the light guide plate 3. Almost all of the introduced light is emitted to both the upper surface 3b and the lower surface 3c of the light guide plate 3. As shown by arrow A, 70 to 90 percent of the emitted light is reflected by the transflector 30 to be emitted to the first LCD panel 10.

On the other hand, 10 to 30 percent of the emitted light is transmitted through the transflector 30 as shown by arrow B. Furthermore, a part of the transmitted light (shown by arrow C) is emitted to the second LCD panel 20.

The light transmitted through the transflector 30 is white light. Using this white light for illuminating the second LCD panel 20 enhances the contrast on the display of the second LCD panel 20.

The amount of light emitted to the first LCD panel 10 ranges between 70 and 90 percent of the total amount of emitted light. This means that most of the light goes to the first LCD panel 10, resulting in increasing luminance of the first LCD panel 10. The luminance of the entire display surface 10a is enhanced, especially, when the first LCD panel 10 is large and used as a primary LCD panel.

Also, since the light emitted to the second LCD panel 20 is 10 to 30 percent of the total amount of light emitted, a higher luminance of the second LCD panel 20 is achievable, compared with no lighting means such as an illuminant. In particular, when the second LCD panel 20 is small and used as an auxiliary LCD panel, a smaller absolute amount of light is required; 10 to 30 percent of the amount of light gives enough luminance.

The first LCD panel 10 and the second LCD panel 20 are transflective. Thus, light emitted from the double-sided illumination plate 2 and external light entering from the outside of the module can both be used for display to achieve high luminance and high contrast.

The double-sided illumination plate 2 illuminates both the first LCD panel 10 and the, second LCD panel 20, thereby reducing the number of components for the double-sided emissive LCD module 1, thus simplifying the module's structure.

Furthermore, the transflector 30 has no openings. Thus, when viewed from the first LCD panel 10, the entire surface of the display surface 10a has a uniform luminance, realizing favorable display quality.

The first LCD panel 10 and the second LCD panel 20 may be driven by various methods. The drive methods include segment type driving, passive matrix type driving, and active matrix type driving for which a thin-film transistor or a thin-film diode is used. The present invention covers LCD panels that use these driving methods.

EXAMPLE

A transflector whose thickness was 0.08 mm and whose reflectance was 97.5% was bonded on the lower surface of a light guide plate to form a double-sided illumination plate. The transflector had a wavelength-vs-reflectance property (the average reflectance at a visible light region in the range of 880 to 780 nm; 97.5%) to a standard white plate, as shown in the graph in FIG. 5. After the light source was lit, the luminance was measured at the upper and the lower sides of the light guide plate. At the upper side the luminance was 3,300 cd/m$^2$, and 290 cd/m$^2$ at the lower side. This shows that a part of the light from the light source was emitted to the lower side.

Figure 5:
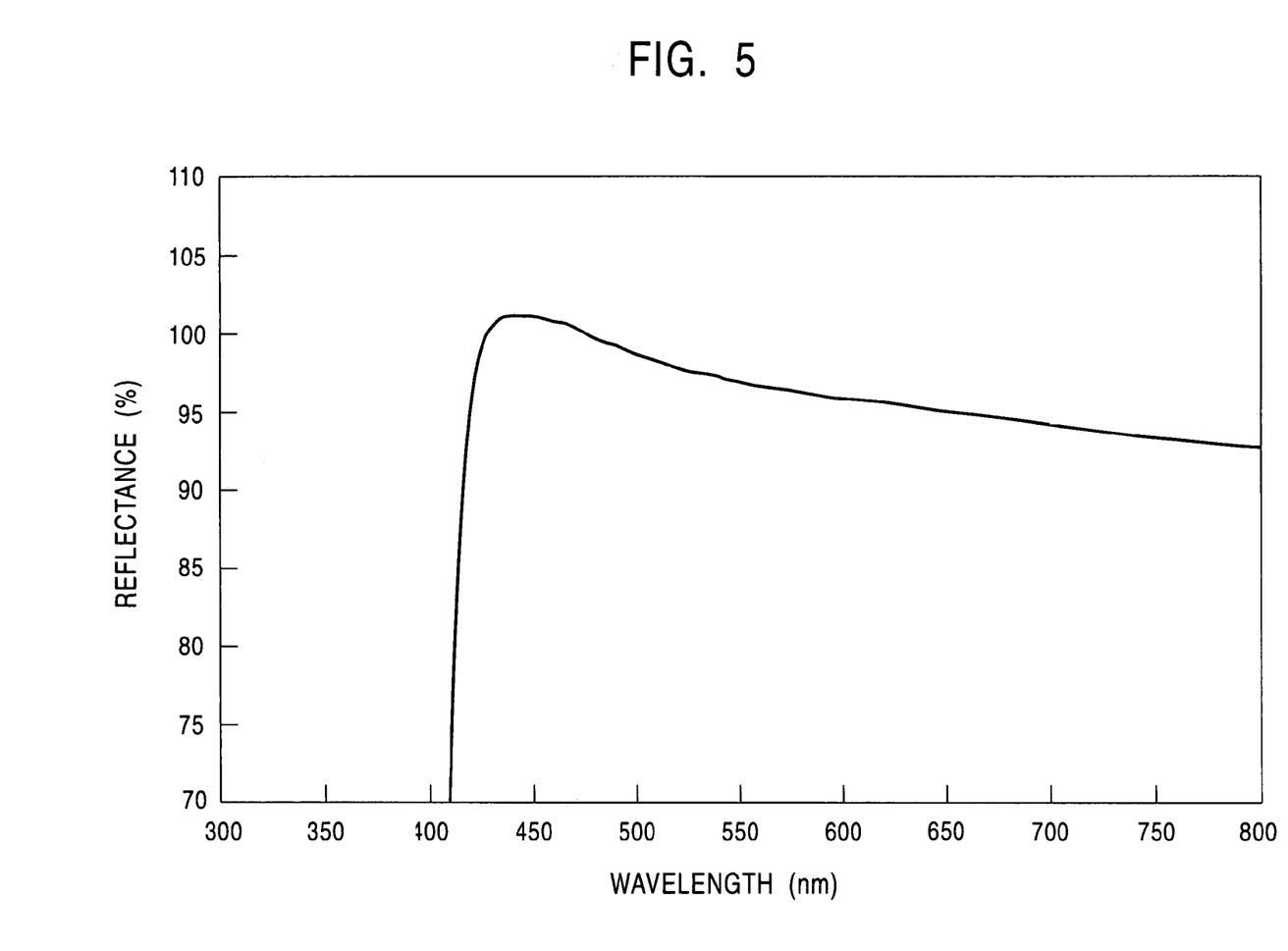
FIG. 5 is a graph showing the wavelength dependence of the reflectance factor of the transflector.

FIG. 5 shows the wavelength dependence of the transflector reflectance.

A color LCD panel with approximately 2% light transmittance was disposed at the upper side of the light guide plate and a monochrome LCD panel with approximately 3% light transmittance was disposed at the lower side.

Under these conditions, the luminance was measured at the surfaces of these LCD panels. At the color LCD panel the luminance was 67 cd/m$^2$, while it was 9.7 cd/m$^2$ at the monochrome LCD panel. Both LCD panels provided enough contrast and viewable displays.

What is claimed is:

1. A double-sided emissive LCD module comprising:
a double-sided illumination plate;
a first LCD display panel disposed at an upper surface of the double-sided illumination plate;
a second LCD display panel disposed at a lower surface of the double-sided illumination plate;
the double-sided illumination plate comprising:
   a light source;
   a light guide plate for emitting light guided from the light source onto the first and the second surfaces; and
   a transflector disposed on a surface of the light guide plate facing the second LCD panel,
   wherein the transflector reflects a part of the light emitted from the light guide plate to the first LCD panel and transmits the rest of the light to the second LCD panel.

2. The double-sided emissive LCD module of claim 1, wherein the double-sided illumination plate emits 70 to 90 percent of the light to the upper surface, and emits 10 to 30 percent of the light to the lower surface.

3. The double-sided emissive LCD module of claim 1, wherein the first LCD panel and the second LCD panel are transflective LCD panels.

4. The double-sided emissive LCD module of claim 1, wherein a prism sheet is disposed between the double-sided illumination plate and the first LCD panel.

* * * * *

UNITED STATES PATENT AND TRADEMARK OFFICE
CERTIFICATE OF CORRECTION

| | |
|---|---|
| PATENT NO. | : 7,123,318 B2 |
| APPLICATION NO. | : 10/689247 |
| DATED | : October 17, 2006 |
| INVENTOR(S) | : Hideaki Nagakubo et al. |

It is certified that error appears in the above-identified patent and that said Letters Patent is hereby corrected as shown below:

<u>In the Claims</u>

Column 8, in claim 3, line 3, delete "transfiective" and substitute --transflective-- in its place.

Signed and Sealed this

Tenth Day of April, 2007

JON W. DUDAS
*Director of the United States Patent and Trademark Office*